(12) United States Patent
Chang et al.

(10) Patent No.: US 8,488,926 B2
(45) Date of Patent: Jul. 16, 2013

(54) PHOTOELECTRIC CONNECTOR ASSEMBLY WITH A LENS MEMBER HAVING LENSES AT OPPOSITE FACES THEREOF

(75) Inventors: Yen-Chih Chang, Tu-Cheng (TW); Wen-Yi Hsieh, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 230 days.

(21) Appl. No.: 12/979,397

(22) Filed: Dec. 28, 2010

(65) Prior Publication Data
US 2011/0158585 A1 Jun. 30, 2011

(51) Int. Cl.
*G02B 6/32* (2006.01)
(52) U.S. Cl.
USPC .................. 385/33; 385/14; 385/34; 385/38; 385/74; 385/89; 385/93; 385/101; 385/131; 385/132; 439/577
(58) Field of Classification Search
USPC ..................................................... 385/33, 89
See application file for complete search history.

(56) References Cited

U.S. PATENT DOCUMENTS

| 7,572,071 | B1 * | 8/2009 | Wu ................................. 385/94 |
| 2003/0152326 | A1 | 8/2003 | Morimoto |
| 2008/0085076 | A1 * | 4/2008 | Lee et al. ........................ 385/14 |
| 2008/0285920 | A1 * | 11/2008 | Budd et al. ..................... 385/50 |

FOREIGN PATENT DOCUMENTS

| CN | 01122658 A | 2/2008 |
| CN | 101221268 A | 7/2008 |
| EP | 078142 B1 | 11/2000 |

* cited by examiner

*Primary Examiner* — Mark Robinson
*Assistant Examiner* — Andrew Jordan
(74) *Attorney, Agent, or Firm* — Wei Te Chung; Ming Chieh Chang

(57) ABSTRACT

A photoelectric connector assembly includes a first lens member connecting with fiber cables and defining convex lenses opposite to fiber cables, a connector and a substrate embedded with waveguides. The connector defines a mating cavity running through a front face thereof and inserted with said first lens member. The connector includes terminals with contacting sections exposing to the mating cavity, a second lens members. The second lens member is located at back of the first lens member and defines first convex lenses at a front face thereof and second convex lenses at a rear face thereof. The first convex lenses are coupled with the convex lens of the first lens member. The substrate defines light ports at free ends of the waveguides. The substrate is seated with the connector and the light ports are coupled with the second convex lenses of the second lens member.

17 Claims, 10 Drawing Sheets

PHOTOELECTRIC CONNECTOR ASSEMBLY WITH A LENS MEMBER HAVING LENSES AT OPPOSITE FACES THEREOF

BACKGROUND OF THE INVENTION

1. Field of the Invention

The present invention relates to a photoelectric connector assembly which is adapted for transmission electric and optical signals.

2. Description of Related Art

Signal transmission through optical fiber cables is developing since light transmission is proven with more advantage than electrics transmission, such as delivering high bandwidth starting at 10 Gb/s with the potential ability to scale to 100 Gb/s. For example, Intel has issued Light Peak Technology on its website. The Light Peak delivers high bandwidth starting at 10 Gb/s with the potential ability to scale to 100 Gb/s over the next decade. Optical technology also allows for smaller connectors and longer, thinner, and more flexible cables than currently possible. Light Peak also has the ability to run multiple protocols simultaneously over a single cable, enabling the technology to connect devices such as peripherals, displays, disk drives, docking stations, and more. The connector as shown in website connects with a plurality of optical fiber cables at a rear end thereof, through which signals are transmitted by the optical fiber cables to other devices.

We hope to desire an improved photoelectric connector on basis of the Light Peak Technology.

SUMMARY OF THE INVENTION

An object of the present invention is to provide a photoelectric connector having two lens members to lower cost.

In order to achieve above-mentioned object, a photoelectric connector assembly comprises a first lens member connecting with fiber cables and defining convex lenses opposite to fiber cables, a connector and a substrate embedded with waveguides. The connector defines a mating cavity running through a front face thereof and inserted with said first lens member. The connector comprises conductive terminals with contacting sections exposing to the mating cavity, and a second lens members. The second lens member is located at back of the first lens member and defines first convex lenses at a front face thereof and second convex lenses at a rear face thereof. The first convex lenses are coupled with the convex lens of the first lens member. The substrate defines light ports at free ends of the waveguides. The substrate is seated with the connector and the light ports are coupled with the second convex lenses of the second lens member.

Other objects, advantages and novel features of the present invention will become more apparent from the following detailed description of the present embodiment when taken in conjunction with the accompanying drawings.

DETAILED DESCRIPTION OF THE INVENTION

Figure 1:
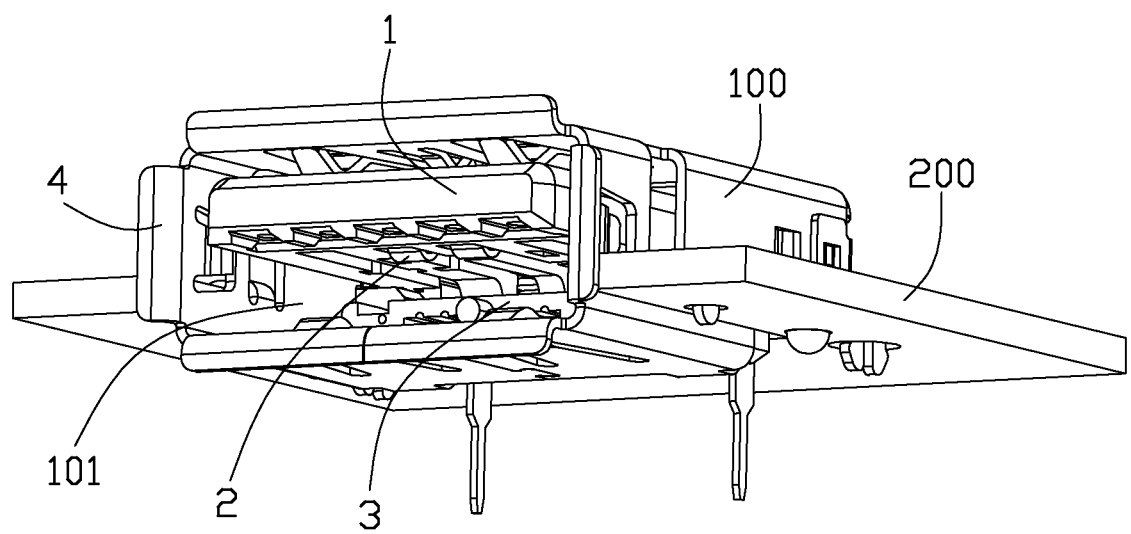
FIG. 1 is a perspective front view of a photoelectric connector assembly mounted on a substrate in accordance with the present invention.

Reference will now be made to the drawing figures to describe the preferred embodiment of the present invention in detail.

Referring to FIG. 1, an photoelectric connector assembly 100 in accordance with the invention is illustrated to includes an photoelectric connector 100 inserted with a first lens member 3 connecting with fiber cables which might be one portion of a complementary plug photoelectric connector (not shown) and a substrate 200 on which the connector 100 is mounted. The photoelectric connector 100 include an insulating housing 1, conductive terminals 2 loaded in the insulating housing, a second lens member 32 and a shielding shell 4 surrounding said elements to construe with a mating cavity 101 thereamong. The connector 100 is mounted in a notch of the substrate 200, i.e., the assembly is a sink type.

Figure 2:
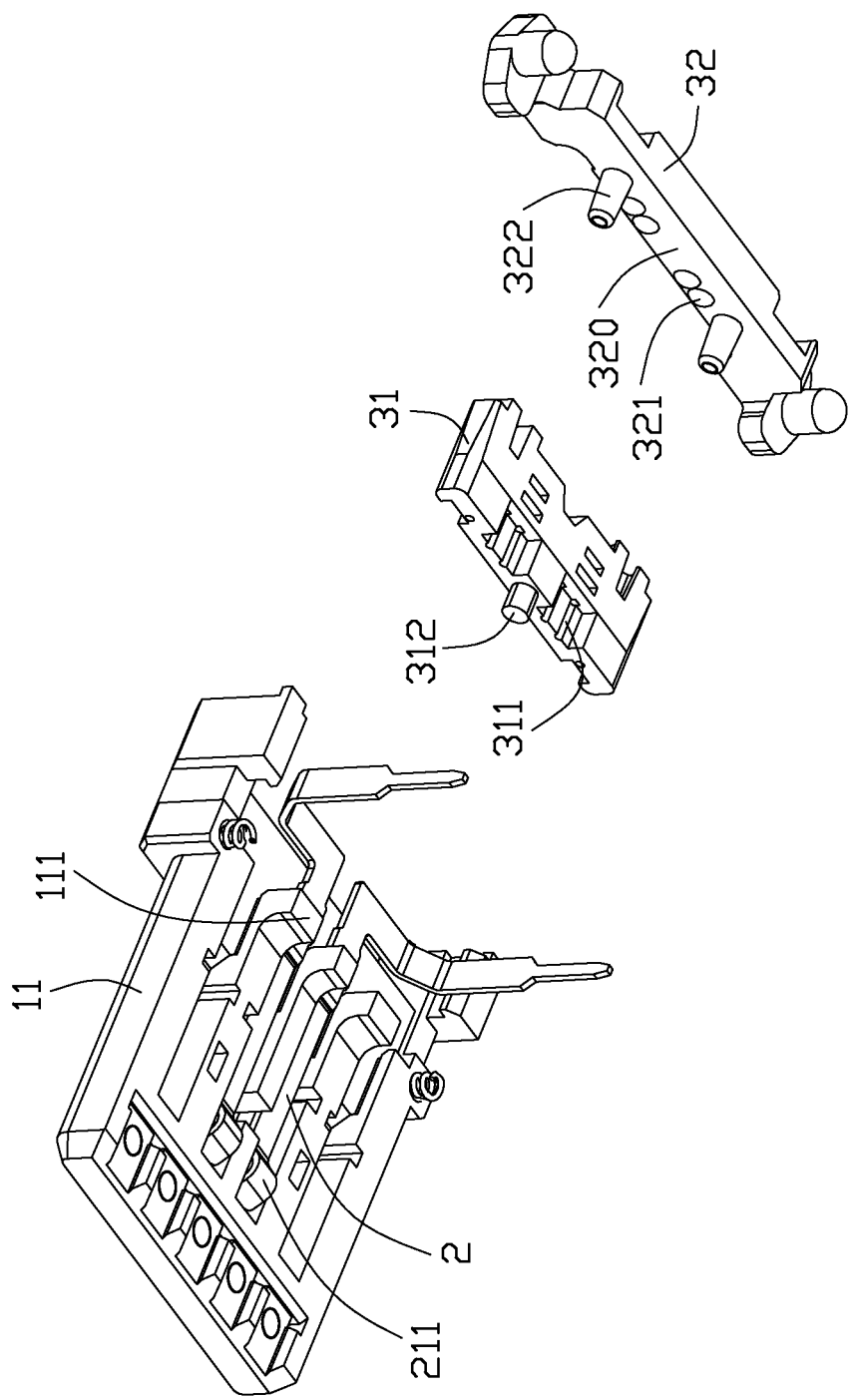
FIG. 2 is an exploded perspective view of the photoelectric connector assembly without a shielding shell.
Figure 3:
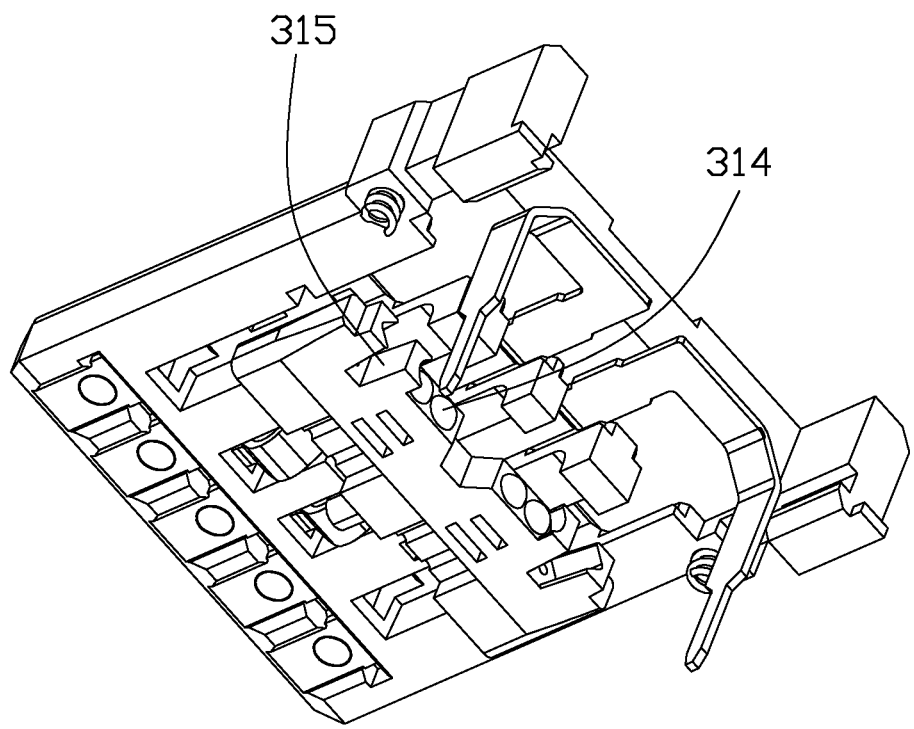
FIG. 3 is an exploded perspective view of an insulating housing and terminals shown in FIG. 2.
Figure 4:
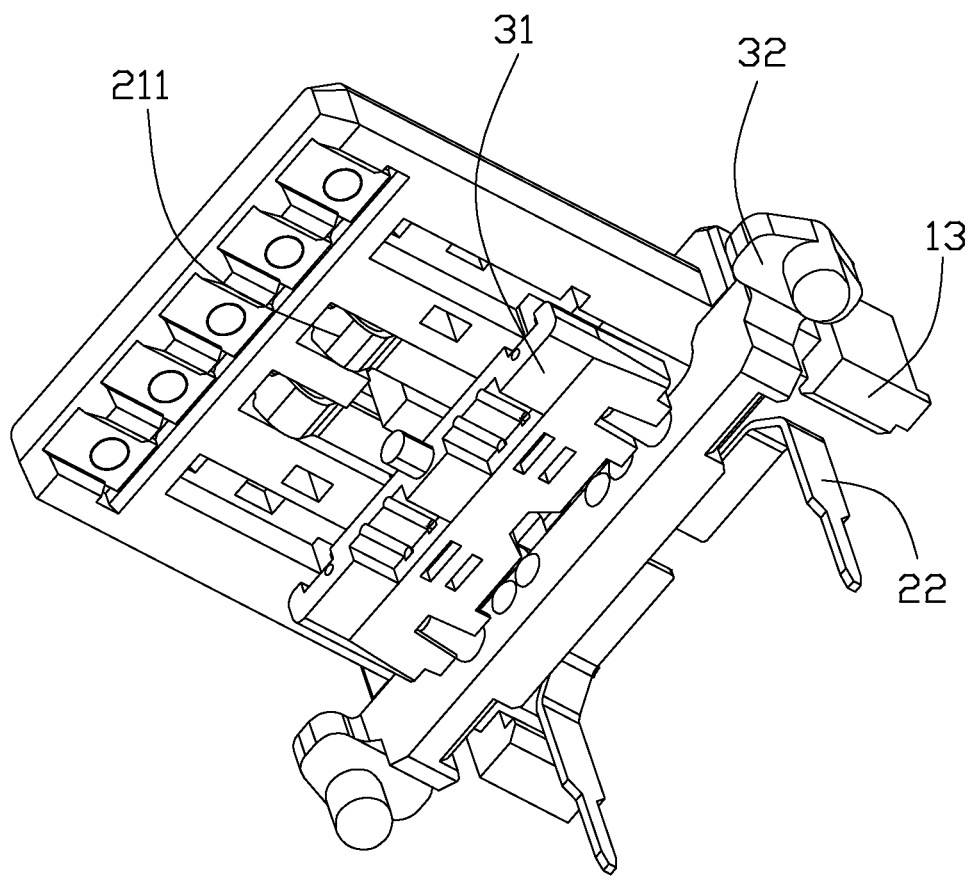
FIG. 4 is a perspective view of the photoelectric connector assembly without a shielding shell.

Referring to FIGS. 2 through 4, the insulating housing 1 of the connector 100 has a forward extending mating tongue 11 with a plurality of passageways (not labeled) at a lower surface thereof to accommodate said conductive terminals 2. The terminals is composed with four pieces (only two are shown in figures) consisting with USB signal transmission definition. The terminals 2 include elastic contacting sections 211 located at the lower surface of the mating tongue 11 and exposing to the mating cavity 101. The housing further defines partitioned ribs 111 between every two passageways, so the terminals are fitly clipped between the partition ribs. Please note, the mating cavity 101 is divided to two portions before the partitioned ribs, a rear portion around the partitioned ribs is adapted for receiving the first lens members and a front portion is adapted for receiving an electrical port which will connect with the terminals.

The first lens member 31 intended to be inserted in the rear portion of the mating cavity 101, defines two pairs of slender holes 311 through a front face thereof which is used to accommodate optical fiber cables of the complementary plug photoelectric connector or other elements. A retained post 312 protrudes forwards between said two pairs of slender holes 311. The first lens member 31 defines two pairs of convex lens 314 at a rear face thereof which are aligned with the holes in an inserted direction of the mating cavity 101. A pair of guiding holes 315 is disposed at two sides of the convex lenses 314.

Figure 5:
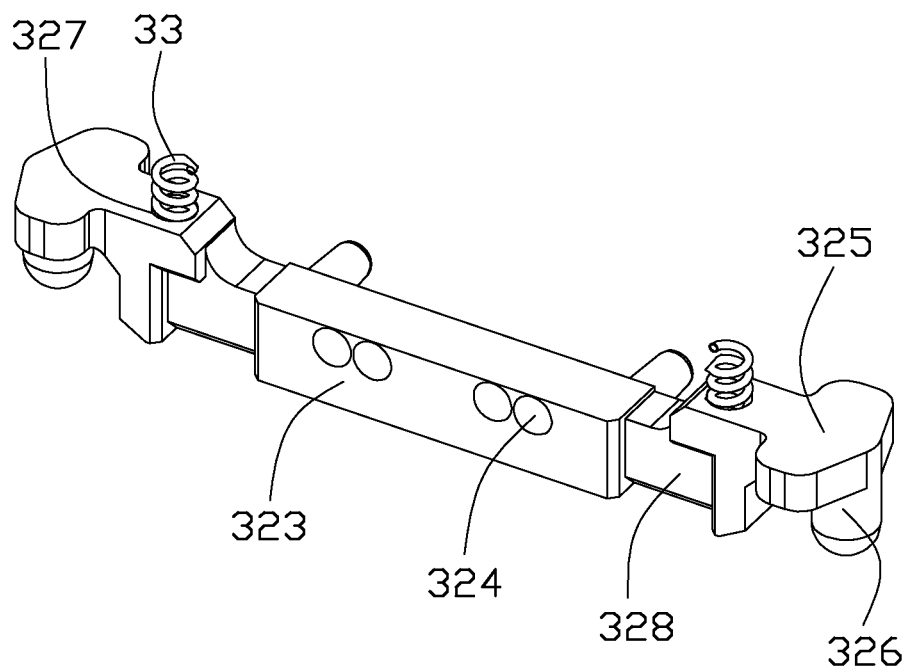
FIG. 5 is a perspective view of a second lens member of the photoelectric connector assembly.

The relation of the first lens member and the second lens member and the terminals are clearly illustrated in FIGS. 2~4. The second lens member 32 is located at back of the first lens member 31. The rear portions of the terminals abut against the bottom of a rear portion thereof and the first lens member 31 is inserted to be located in front of the partitioned ribs rib 111 and behind the contacting sections 211 of the terminals 2. The second lens member 32 is located at the rear side of the partitioned ribs 11, wherein the guiding posts 322 are inserted in the guiding holes 315. The two pairs of convex lenses 314 and 321 are aligned with each other to be coupled with each other. The second lens member 31 is limited by and between the projecting portions 13 and the leg portions 22 are located at rear of the second lens member 32 and between said two projecting portions 13. Seeing FIG. 5, the second lens member 32 has integrally positioning portions 325 at two opposite ends thereof and a positioned post 326 extends downwards from a bottom of each positioning portion 325. The positioning posts 325 are located at a substantial level to the second lens member 32. The position portions 325 each define a recess 327 on top faces thereof to accommodate one end of a coil spring 33, another end of the coil spring 33 is pressed against the bottom face of the rear portion of the insulating housing as clearly shown in FIG. 2. The coil spring 3 allows the second lens member 32 to shift in the vertical direction, i.e, said second lens member 32 being floating relative to the printed circuit board and the housing. The second lens member 32 further defines two pairs of second convex lenses 324 aligned with the said first convex lenses at a rear face 323 opposite to the front face 320 thereof.

Figure 6:
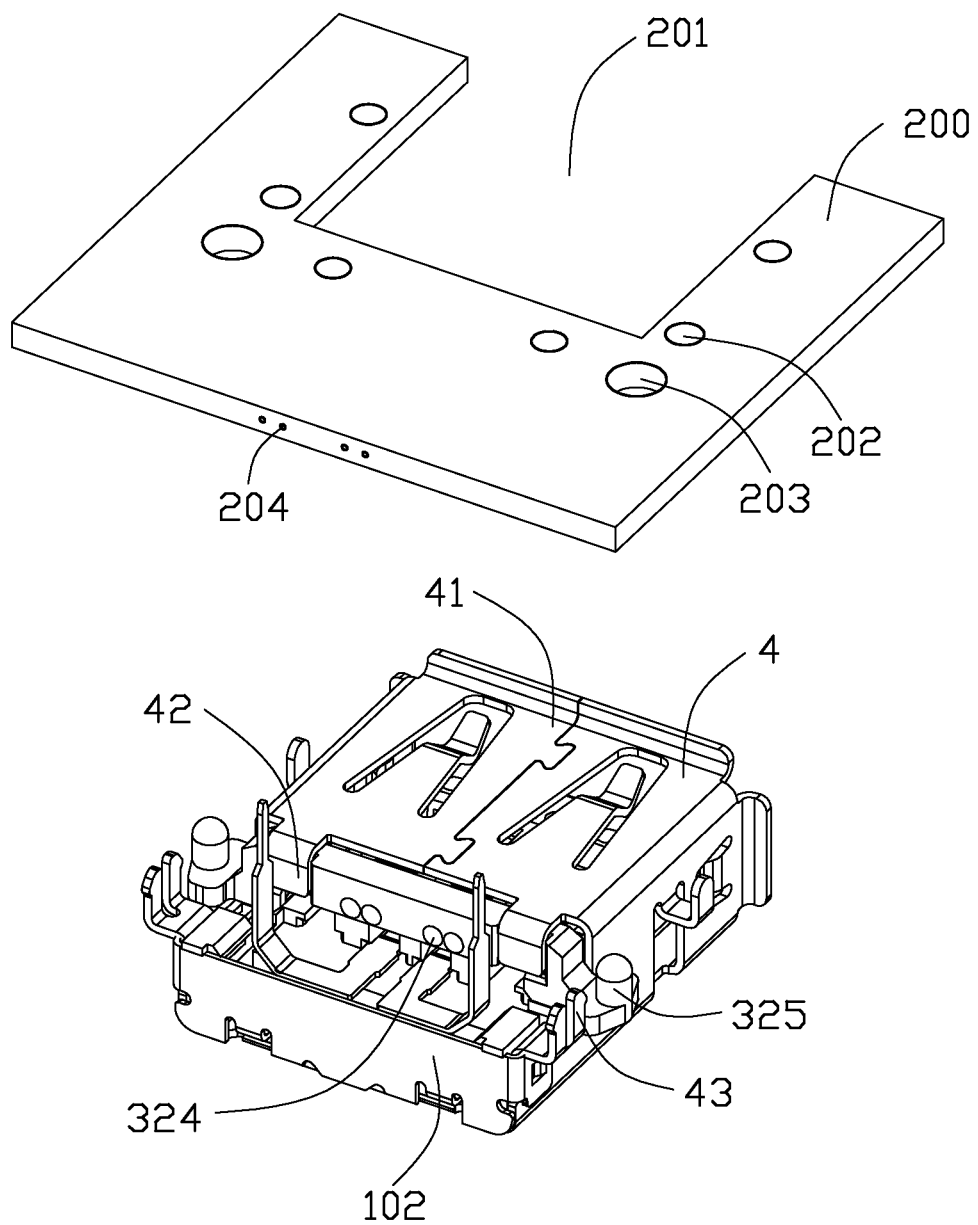
FIG. 6 is a partial perspective view of the photoelectric connector separated from the substrate.
Figure 7:
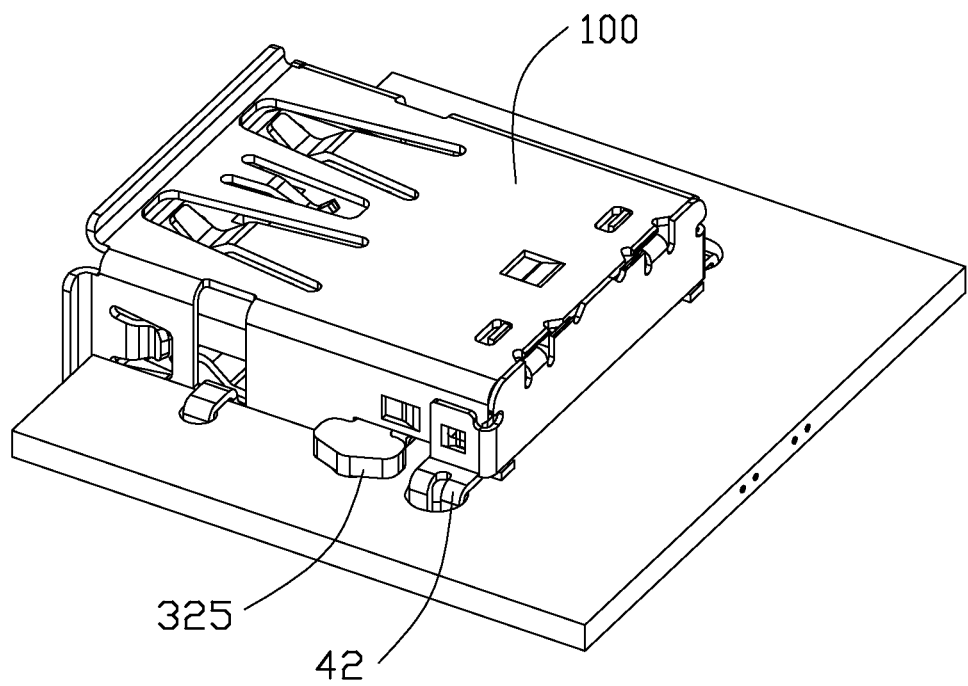
FIG. 7 is similar to FIG. 1 from a rear view.

Referring to FIGS. 1 and 6, the shielding shell 4 of rectangular shape surrounding the housing has two upwards retaining tabs 42 bending from the rear edge of a bottom wall 41, which just located in the hollow recesses 328 (labeled in FIG. 5) at the rear face 323 of the second lens member 32 to retain the second lens member in the connector. Combination with FIG. 7, the positioning portions 325 of the second lens member extend outwards beyond the sidewalls of the shell 4 and the shell 4 has a pair of the legs 43 extending downwards from the rear side edge of the top wall thereof which is located just behind the positioning posts 325. The connector is construed with a step rear portion 102 and the second convex lenses 324 expose rearward to an exterior. The step rear portion 102 just presses against the substrate, wherein the positioned posts and the legs are intended to be inserted into the holes 202, 203 opened in the substrate 200 to assemble the connector 100 in the notch 201 in the PCB. I.E., the connector 100 is sunk in the notch 201.

Figure 8:
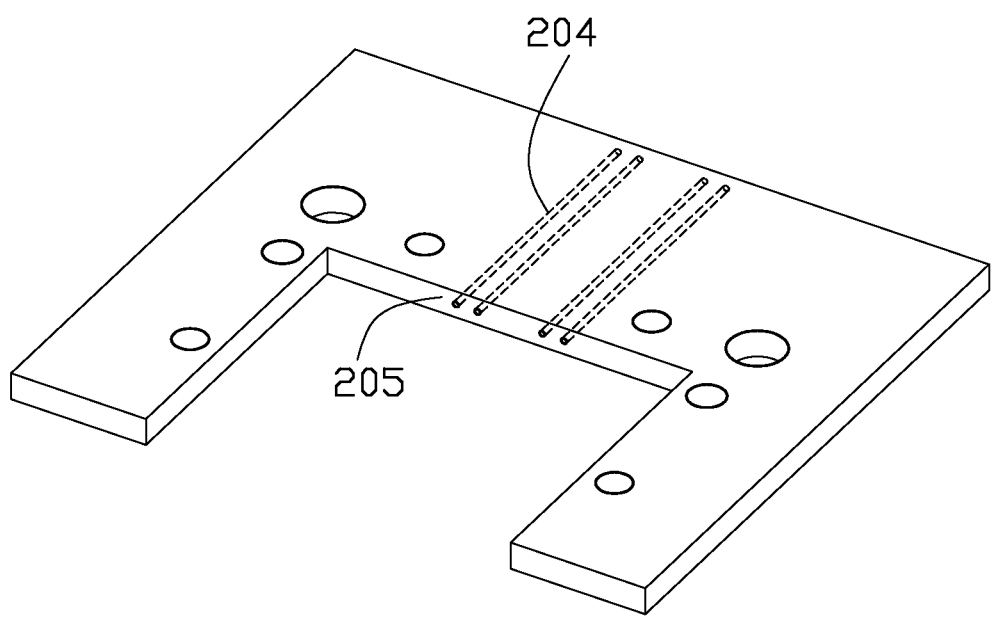
FIG. 8 is a perspective view of the substrate.
Figure 9:
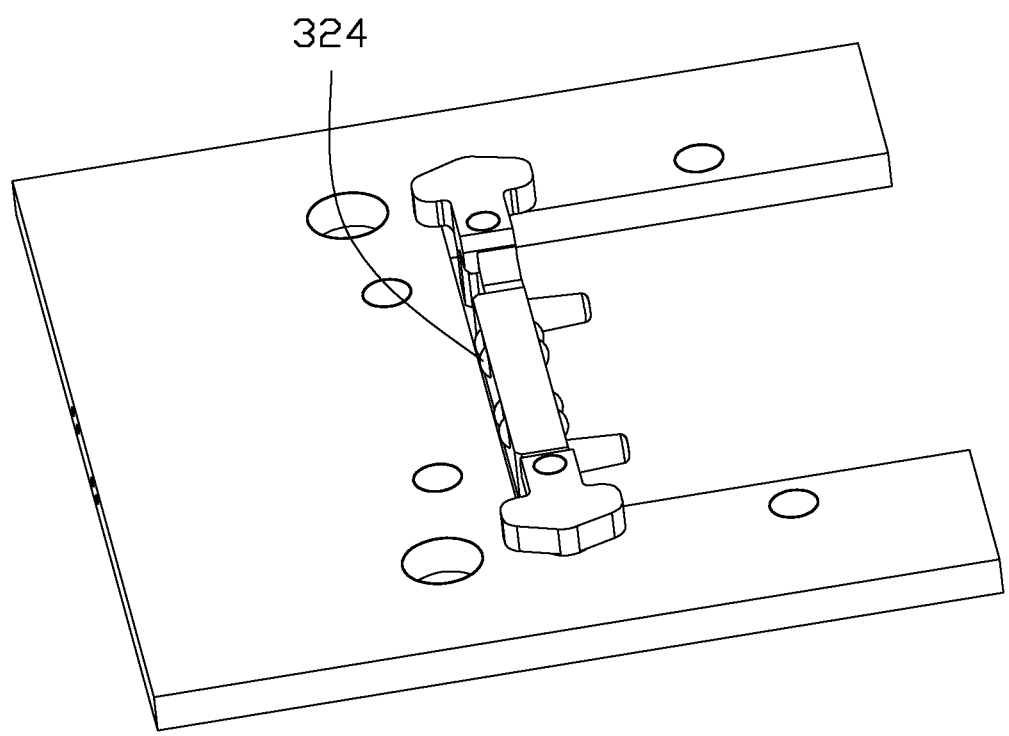
FIG. 9 is an engagement perspective view of the substrate and the second lens member.

Referring to FIGS. 8 and 9, the substrate 200 is embedded with two pairs of waveguides 204 therein and defines light ports at free ends of the waveguide at a rear edge 205 thereof facing to the opening of the notch 201. The two pairs of light ports are used to be coupled with convex lenses of the second lens member 32.

Figure 10:
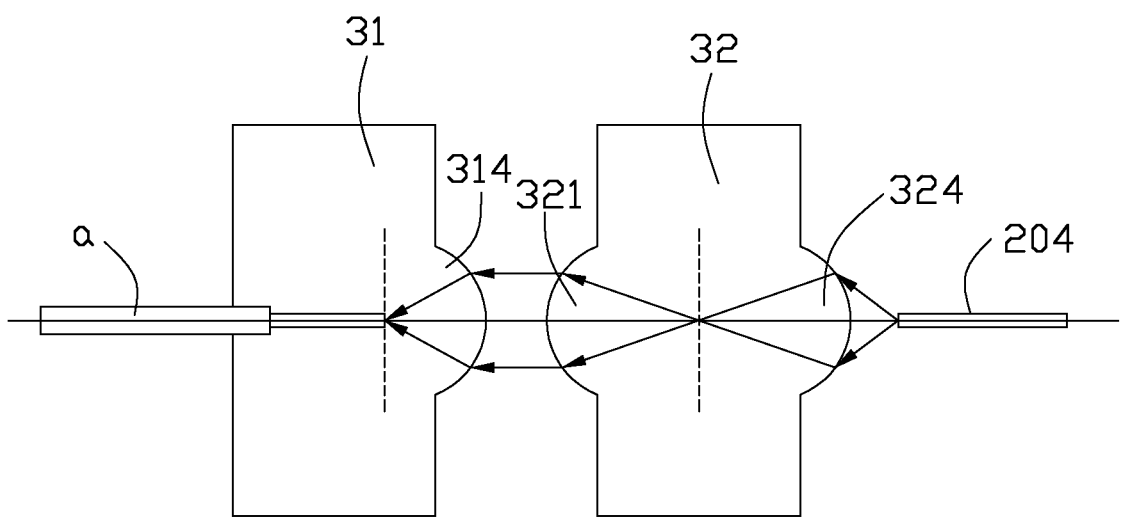
FIG. 10 is a schematic view of light path through said two lens members.

Referring to FIG. 10 shown light path through said two lens members 31, 32, the light-rays a from a CPU or other controller device pass through the waveguides 204 of the substrate and emit to the second convex lenses 324 of the second lens member 32. Then light-rays concentrate after passing the second convex lenses and then go to the first convex lenses to disperse. The light-rays after passing the first convex lenses are arrived to the convex lenses of the first lens member 31 to focus. The light can be backwards transmitted. So the convex lenses can be functioned as light receiving area and light emitting area. The second convex lenses 324 of the second lens member 32 are aligned with the first convex lens 321 in inserted direction, i.e., the second lens member 32 is provided with the light receiving area and the light emitting area, so the optical signals can be transmitted by the waveguides 204 in the substrate 200 to abandon the conventional optical fiber cable and connector.

However, the disclosure is illustrative only, changes may be made in detail, especially in matter of shape, size, and arrangement of parts within the principles of the invention.

What is claimed is:

1. A photoelectric connector assembly comprising:
    a first lens member connecting with fiber cables and defining convex lenses opposite to fiber cables;
    a connector defining a mating cavity running through a front face thereof and inserted with said first lens member and comprising:
        conductive terminals with contacting sections exposing to the mating cavity in front of the first lens member;
        a second lens member located at back of the first lens member and defining a first convex lens at a front face thereof and a second convex lenses at a rear face thereof, the first convex lenses being coupled with the convex lens of the first lens member;
    a substrate embedded with waveguides and defining light ports at free ends of the waveguides;
    wherein the substrate is seated with the connector and the light ports are coupled with the second convex lenses of the second lens member;
    wherein the first and the second convex lenses of the second lens member are aligned with each other in an inserted direction of the mating cavity;
    wherein the substrate defines a notch at one edge thereof and a step rear portion of the connector presses against the substrates and a front portion of the connector is sunk in the notch.

2. The photoelectric connector assembly as described in claim 1, wherein the second lens member is located under the step rear portion of the connector and a coil spring is sandwiched between the step rear portion and a top face of the second lens member so that the second lens member shift relative to the step portion to keep a good alignment with the light ports of the substrate.

3. The photoelectric connector assembly as described in claim 2, wherein the convex lenses of the first lens member are located below and behind the contacting sections of the conductive terminals.

4. The photoelectric connector assembly as described in claim 3, wherein the connector comprises a plurality of partitioned ribs between every two conductive terminals to retain the conductive terminals, and the first and the second lens members are located at two sides of the plurality of partitioned ribs in the inserted direction.

5. The photoelectric connector assembly as described in claim 4, wherein the conductive terminals comprise leg portions located behind the second lens member.

6. An photoelectric connector comprising:
    an insulating housing comprising a mating tongue extending forwards;
    a shielding shell surrounding the insulating housing and defining a mating cavity between a surface of the mating tongue and the shielding shell;
    a plurality of conductive terminals comprising contacting sections arranged on said surface of the mating tongue and exposing to the mating cavity and leg portions; and
    a lens member located at a rear portion of the insulating housing and comprising first convex lenses and second convex lenses opposite to the first convex lenses, the first convex lenses facing towards the mating cavity and behind the contacting sections of the terminals in a perpendicular direction to an extending direction of the mating tongue, the second convex lenses exposing to an exterior at a rear edge of the connector;
    wherein the connector is construed with a step rear portion to which the second convex lenses expose and the leg portions of the conductive terminals extend rearward along the step rear portion and the bends away from the step rear portion.

7. The photoelectric connector as described in claim 6, wherein a pair of the coiling springs is sandwich between the second lens member and the insulating housing to allow the second lens member a small shift relative to the insulating housing.

8. A photoelectric connector assembly comprising:
a printed circuit board defining a notch and defining, in a front-to-back direction, a rear edge forwardly facing said notch;
a waveguide set embedded within the printed circuit board and communicating with an exterior through said rear edge;
a connector including an insulative housing enclosed by a metallic shell and commonly received in the notch and defining a mating port thereof for receiving a plug;
a plurality of conductive contacts disposed in the housing with contacting sections exposed in the mating port; and
a lens member mounted upon at least one of said connector and said printed circuit board and including lenses with opposite front and rear ends thereof; wherein
said front end is exposed in the mating port for coupling to an optical member of the plug connector, and said rear end is essentially aligned and directly communicates with the waveguide in said front-to-back direction.

9. The photoelectric connector assembly as claimed in claim 8, wherein sad lens member is floating relative to the printed circuit board and the housing.

10. The photoelectric connector assembly as claimed in claim 9, wherein said lens member is floating in a direction perpendicular to the printed circuit board.

11. The photoelectric connector assembly as claimed in claim 9, wherein the optical member of the plug is floating in a direction parallel to the printed circuit board.

12. The photoelectric connector assembly as claimed in claim 11, wherein an interface between the lenses of the lens member and the optical member is configured to have light transmitted therebetween in a direction parallel to the printed circuit board.

13. The photoelectric connector assembly as claimed in claim 8, wherein an interface between the lenses of the lens member and the waveguide set is configured to have light transmitted from the lens member to the waveguide set in a converging manner.

14. The photoelectric connector assembly as clamed in claim 8, wherein said lens member is mounted upon the printed circuit board.

15. The photoelectric connector assembly as claimed in claim 8, wherein said contacts further include tail sections mounted to the printed circuit board.

16. The photoelectric connector assembly as claimed in claim 8, wherein said shell includes legs mounted to the printed circuit board.

17. The photoelectric connector assembly as claimed in claim 8, wherein the lenses of the lens member is essentially coplanar with the printed circuit board while said tongue plate is offset from the printed circuit board in a parallel relation.

* * * * *